(12) United States Patent
 Caspi

(10) Patent No.: US 10,384,391 B2
(45) Date of Patent: Aug. 20, 2019

(54) MOLD FOR PRODUCING THREE-DIMENSIONAL DECORATIVE ARTICLES AND METHOD OF USE

(71) Applicant: Alex Toys, LLC, Fairfield, NJ (US)

(72) Inventor: Liah Caspi, Closter, NJ (US)

(73) Assignee: Alex Toys, LLC, Fairfield, NJ (US)

( * ) Notice: Subject to any disclaimer, the term of this patent is extended or adjusted under 35 U.S.C. 154(b) by 657 days.

(21) Appl. No.: 15/042,917

(22) Filed: Feb. 12, 2016

(65) Prior Publication Data

US 2017/0232658 A1 Aug. 17, 2017

(51) Int. Cl.
| | | |
|---|---|---|
| B29C 51/08 | (2006.01) | |
| B29C 33/00 | (2006.01) | |
| B29C 51/42 | (2006.01) | |
| B29C 51/44 | (2006.01) | |
| B29C 33/12 | (2006.01) | |
| B29C 51/26 | (2006.01) | |
| B29C 33/14 | (2006.01) | |
| B29K 625/00 | (2006.01) | |
| B29L 31/00 | (2006.01) | |
| B29C 51/30 | (2006.01) | |
| B29C 43/36 | (2006.01) | |

(52) U.S. Cl.
CPC ........ B29C 51/085 (2013.01); B29C 33/0033 (2013.01); B29C 33/12 (2013.01); B29C 33/123 (2013.01); B29C 33/126 (2013.01); B29C 33/14 (2013.01); B29C 51/262 (2013.01); B29C 51/42 (2013.01); B29C 51/421 (2013.01); B29C 51/44 (2013.01); B29C 51/306 (2013.01); B29C 2043/3602 (2013.01); B29C 2043/3639 (2013.01); B29K 2625/06 (2013.01); B29K 2883/00 (2013.01); B29K 2995/0049 (2013.01); B29L 2031/722 (2013.01)

(58) Field of Classification Search
USPC .............................................. 269/53; 425/400
See application file for complete search history.

(56) References Cited

U.S. PATENT DOCUMENTS

| | | | | |
|---|---|---|---|---|
| 203,670 | A * | 5/1878 | Stevens | B29C 33/00 425/400 |
| 647,520 | A * | 4/1900 | Prindle | B25B 5/006 269/157 |

(Continued)

OTHER PUBLICATIONS

Nixon, R. (Producer). (Oct. 9, 2012). Shrinky Dink Button Tutorial [Video file]. from https://www.youtube.com/watch?v=B4WgvDzG2UQ (Year: 2012).*

Primary Examiner — Seyed Masoud Malekzadeh
Assistant Examiner — Manley L Cummins, IV
(74) Attorney, Agent, or Firm — Howson & Howson LLP

(57) ABSTRACT

Three-dimensional decorative articles are produced from blanks of heat-shrinkable plastic sheet material, using a mold base having an outer surface with a recess over which a blank is placed, and a convex mold insert that moves into the recess by gravity as the blank softens and cooperates with the interior wall of the recess to shape the sheet material into a three-dimensional decorative article. A guide peg extends outward from the bottom of the recess past the outer surface of the mold base and extends through a hole formed in the blank, and through a guide hole in the mold insert to support the mold insert before heating and to guide the mold insert as it moves into the recess of the mold base.

10 Claims, 4 Drawing Sheets

(56) References Cited

U.S. PATENT DOCUMENTS

| | | | |
|---|---|---|---|
| 1,229,572 A * | 6/1917 | Birnzweig | B29C 51/32 425/292 |
| 1,241,338 A * | 9/1917 | Brown | B25B 5/06 269/286 |
| 1,492,179 A * | 4/1924 | Person | B29C 33/00 264/325 |
| 1,793,603 A * | 2/1931 | Frederick | B26F 1/40 425/292 |
| 1,858,225 A * | 5/1932 | Frederick | B26F 1/40 264/153 |
| 1,872,269 A * | 8/1932 | Frederick | B32B 27/00 156/211 |
| 2,272,920 A * | 2/1942 | Merta | B29C 51/26 229/400 |
| 2,390,803 A * | 12/1945 | Marschner | B29C 43/085 264/220 |
| 2,953,180 A * | 9/1960 | Kyles | A47G 19/02 269/310 |
| 3,059,810 A * | 10/1962 | Edwards | B29C 51/04 206/520 |
| 3,412,427 A * | 11/1968 | Flusfeder | B29B 11/08 264/107 |
| 3,470,281 A * | 9/1969 | Knowles | B29C 51/04 264/294 |
| 3,475,790 A * | 11/1969 | Bush | B29D 99/0053 425/308 |
| 3,517,410 A * | 6/1970 | Rapisarda | B26F 1/24 264/156 |
| 3,826,600 A * | 7/1974 | Hutton | B29C 43/02 425/123 |
| 3,947,204 A * | 3/1976 | Ayres | B29C 43/361 425/383 |
| 4,027,845 A * | 6/1977 | Putzer | B28B 7/06 249/142 |
| 4,055,620 A * | 10/1977 | Conrad | B29C 33/0011 264/313 |
| 4,141,541 A * | 2/1979 | Ackeret | A47J 19/022 269/6 |
| 4,332,766 A * | 6/1982 | Erickson | F42B 5/30 264/249 |
| 4,388,356 A * | 6/1983 | Hrivnak | B29C 51/04 264/544 |
| 4,420,454 A * | 12/1983 | Kawaguchi | B29C 51/04 264/322 |
| 4,692,111 A * | 9/1987 | Wagner | B29C 33/46 425/388 |
| 4,738,809 A * | 4/1988 | Storch | B29C 33/126 249/91 |
| 4,774,046 A * | 9/1988 | Watanabe | B29C 43/361 264/321 |
| 4,778,439 A * | 10/1988 | Alexander | B29C 51/082 493/169 |
| 5,080,742 A * | 1/1992 | Takahashi | B29C 51/12 156/212 |
| 5,096,627 A * | 3/1992 | Vogelgesang | G11B 7/0025 264/1.9 |
| 5,198,176 A * | 3/1993 | Fortin | B29C 49/00 264/230 |
| 5,228,934 A * | 7/1993 | Weder | A47G 7/085 156/227 |
| 5,467,573 A * | 11/1995 | Weder | A01G 5/04 53/397 |
| 5,573,789 A * | 11/1996 | Weder | A01G 9/02 425/394 |
| 5,616,380 A * | 4/1997 | Weder | A01G 5/04 206/423 |
| 5,882,567 A * | 3/1999 | Cavallaro | B29C 43/146 264/250 |
| 6,315,150 B1 * | 11/2001 | Takai | B29C 51/04 220/608 |
| 6,508,289 B2 * | 1/2003 | Hagai | B29C 43/184 156/443 |
| 6,769,900 B2 * | 8/2004 | Murphy | A63B 37/0013 249/123 |
| 7,244,384 B1 * | 7/2007 | Dewanjee | A63B 45/00 156/146 |
| 7,793,705 B2 * | 9/2010 | Kuo | B22D 17/229 164/340 |
| 7,926,693 B2 * | 4/2011 | Schramm | B23Q 3/183 219/158 |
| 8,021,590 B2 * | 9/2011 | Kuttappa | A63B 37/0003 264/277 |
| 2004/0028563 A1 * | 2/2004 | Cunningham | B29C 33/0033 249/134 |
| 2006/0286196 A1 * | 12/2006 | Chien | B29C 43/146 264/250 |
| 2007/0296117 A1 * | 12/2007 | Taeye | B29C 51/087 264/271.1 |
| 2010/0303944 A1 * | 12/2010 | Yeh | A63B 45/00 156/146 |
| 2011/0070974 A1 * | 3/2011 | Omura | B22D 17/229 164/340 |
| 2011/0147995 A1 * | 6/2011 | Fingerhut | B29C 51/085 264/322 |
| 2015/0306809 A1 * | 10/2015 | Shanley, IV | B29C 51/085 264/322 |
| 2016/0046064 A1 * | 2/2016 | Sartor | B29C 51/087 264/271.1 |

\* cited by examiner

MOLD FOR PRODUCING THREE-DIMENSIONAL DECORATIVE ARTICLES AND METHOD OF USE

FIELD OF THE INVENTION

This invention relates to hobby crafts, and particularly to a mold for producing decorative articles from heat-shrinkable sheet material, and to a method for producing such articles using the mold.

BACKGROUND OF THE INVENTION

For about forty years, a popular hobby craft activity for both children and adults has been the production of objects from a heat-shrinkable sheet material known by the trademark SHRINKY DINKS, a registered trademark of K & B Innovations, Inc. The material consists of a sheet of thin plastic material that can be colored and/or cut out, and then heated to cause it to shrink and form thickened and hardened art forms. Typically the plastic sheet material is composed of a heat-shrinkable polystyrene base material coated with a water-insoluble, ink-receptive coating. The sheet material and some of its uses are described in U.S. Pat. No. 4,102,456, granted Jul. 25, 1978, and U.S. Pat No. 6,157,865, granted Dec. 5, 2000. Coatings for the base material are described in U.S. Pat. No. 3,889,270 granted Jun. 10, 1975, U.S. Pat. No. 4,503,111 granted Mar. 5, 1985, U.S. Pat. No. 4,555,437 granted Nov. 26, 1985, U.S. Pat. No.5,190,805 granted Mar. 2, 1993 and U.S. Pat. No.5,206,071, granted Apr. 27, 1993. The disclosures of all of the aforementioned United States patents are incorporated by reference.

Although various kinds of apparatus and methods for producing decorative articles from heat-shrinkable sheet material are known, there remains a need for a simple, easy-to-use, and reliable, way to produce three-dimensional articles such as flower-shaped or leaf-shaped pieces can be used as jewelry, or concave butterfly-shaped pieces that can be combined with miniature incandescent bulbs or light-emitting diodes to produce strings of decorative lighting.

SUMMARY OF THE INVENTION

One aspect of the invention is a method of making a three-dimensional decorative article from a flat blank composed of heat-shrinkable plastic sheet material and having first and second opposite sides. The method utilizes a mold comprising a mold base having an outer surface with a concave recess having a bottom, and a mold insert having a convex mold portion insertable into the recess. At least a part of the convex mold portion is shaped so that it can be substantially uniformly spaced from the bottom of the concave recess when the convex mold portion is inserted into the recess by a predetermined distance. The three-dimensional decorative article is produced by positioning the flat blank with a part of its second side in engagement with the outer surface of the mold base and with a part of the flat blank overlying the recess. The convex mold portion is brought into contact with the first side of the flat blank in the part thereof that overlies the recess. The assembly comprising the mold and the flat blank is heated, thereby softening and shrinking the flat blank. While the mold and the flat blank are heated, the convex mold portion enters the recess and pushes the flat blank into the recess, thereby causing the flat blank to be formed into a condition in which its first side becomes concave and conforms to the convex portion of the mold insert, while the second side of the flat blank becomes convex and conforms to the bottom of the recess. The mold is then cooled, and the formed blank is thereby allowed to harden. The formed blank can then be removed from the mold.

Preferably, the mold insert is formed with a flange on its convex mold portion that extends outward from the convex mold portion by a distance such that at least a part of the flange can overlie at least a part of the outer surface of the mold when the mold insert is inserted into the recess. The mold insert can be removed from the recess by manually gripping the flange, and the formed blank can then be removed from the mold.

The mold base is preferably composed of a layer of silicone rubber having a substantially uniform thickness. The uniform thickness of the mold base promotes uniform heating of the blank and also allows the mold cavity to be turned inside-out for removal of the formed article. The mold insert is also preferably composed of silicone rubber.

Another aspect of the invention is the mold itself. The outer surface of the mold base preferably includes a top surface, in which one or more concave recesses are formed. Preferably, each concave recess has an upwardly facing bottom, with a lowermost part. A guide peg is fixed to the upwardly facing bottom at the lowermost part of the recess and extends upward from the bottom and beyond the top surface of the mold. Each mold insert preferably has a convex mold portion insertable into a recess, and a guide hole having an opening in its convex mold portion for receiving the guide peg. At least a part of the convex mold portion surrounding the opening of the guide hole has a tip surrounding the opening of the guide hole, and is shaped so that it is substantially uniformly spaced from an opposed bottom portion of the concave recess when the convex mold portion is inserted into the recess and the tip is located at a predetermined distance from the lowermost part of the upwardly facing bottom of the recess. When the mold having a guide peg is used, the mold insert is properly supported when in engagement with the flat blank, and can slide downward by gravity on the guide peg into the recess when the blank softens as the mold assembly is heated.

The convex mold portion of the mold insert can have a concave interior surface with an apex adjacent the opening of the guide hole. In this case, the mold portion can be formed with a tube extending from the apex and having a central passage forming the guide hole. Plural spokes connect the tube to the concave interior surface of the convex mold portion. In this embodiment, thick surfaces are avoided and heat can be conducted more uniformly though the insert to the heat-shrinkable blank.

DETAILED DESCRIPTION OF THE PREFERRED EMBODIMENTS

Figure 1:
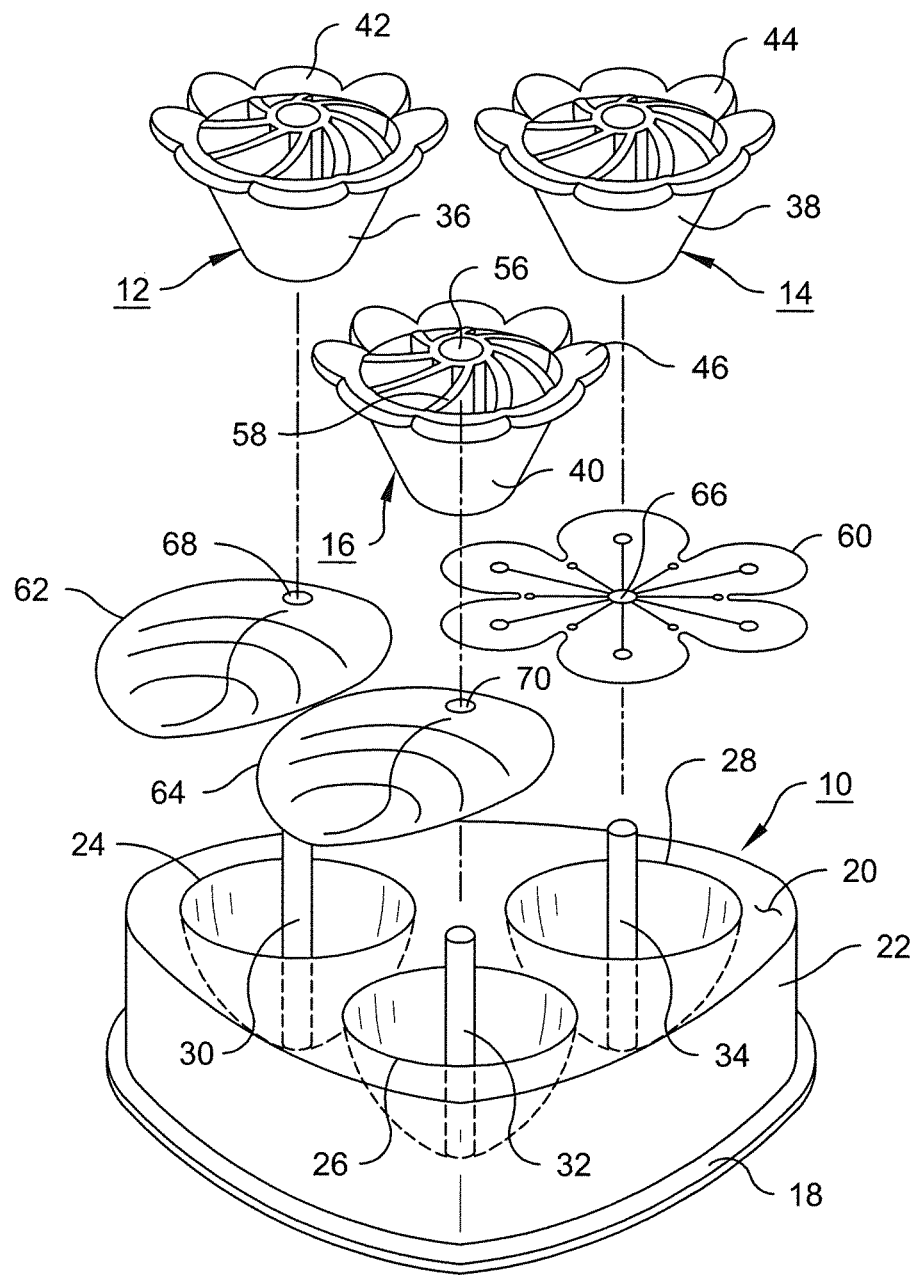
FIG. 1 is an exploded perspective view illustrating the process of fitting flat blanks of shrinkable sheet material to a mold in accordance with the invention.

FIG. 1 shows a three-cavity mold base 10 and three inserts 12, 14 and 16. The mold base 10 and the inserts are preferably formed of a heat-resistant silicone rubber composition of the kind used in the manufacture of baking molds.

The bottom of base 10 consists of a flange 18, and is adapted to rest on a flat horizontal surface (not shown), e.g., a tray or a metal grid in an oven. A top surface 20 is spaced from the bottom and connected to the flange 18 by a wall 22. Three recesses 24, 26 and 28 are formed in the top surface 20. A peg 30 extends upward from the bottom of recess 24, past the level of the top surface 20, and pegs 32 and 34 similarly extend upward form the bottoms of recesses 26 and 28, respectively. The pegs 30, 32 and 34 are unitary molded parts of the mold base 10 and composed of the same material from which the rest of the base is formed.

The internal surface of each of the recesses 24, 26 and 28 preferably has a concave curvature over its entire area, from the location of the bottom of its peg to the location at which the surface of the recess meets the top surface 20 of the base. Portions of the recess can be straight, and can even have a slightly convex curvature. However, proceeding from the bottom of a recess toward the top surface 20, the diameter of each recess should not decrease at any location, in order to avoid overhang.

Preferably all three recesses 24, 26 and 28, are identical to one another and all three inserts 12, 14 and 16 are also identical to one another. The inserts 12, 14 and 16 have convex parts 36, 38, and 40, shaped to fit into recesses 24, 26 and 28, respectively, and flanges 42, 44 and 46 from which the convex parts protrude. When the inserts are inserted into the recesses, parts of their flanges overlie parts of the top surface 20 of the base. The flanges, which preferably extend obliquely upward as well as outward in the radial direction can be gripped manually and used to remove the mold inserts from the mold base after molding is completed. The convex part of each insert is preferably shaped so that it is spaced uniformly from the concave surface of the recess into which it is inserted, when the tip of the insert is at a predetermined distance from the bottom of the concave recess of the mold base. An example of this uniform spacing is space 48 in FIG. 4.

Figure 4:
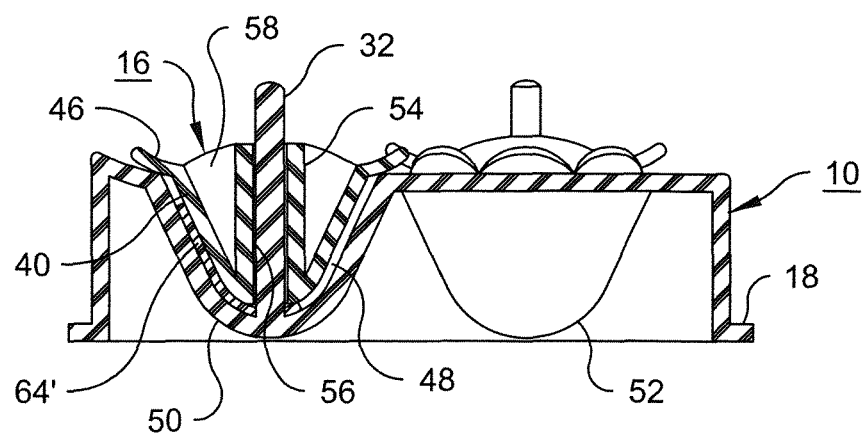
FIG. 4 is a cross-sectional view taken on section plane 4-4 in FIG. 3.

As shown in FIG. 4, the mold base 10 is in the form of a molded sheet of silicone rubber or similar material and has a substantially uniform thickness. Forming the mold base in this manner allows the decorative articles that are formed in the mold to be removed by pressing upwardly on the bottoms (e.g. bottoms 50 and 52 in FIG. 4) of the recesses, thereby turning the recesses inside-out.

The parts of the inserts also preferably have a uniform thickness so that they conduct heat uniformly. Thus, as shown in FIG. 4, the convex part 40 of insert 16 has a substantially uniform thickness. Insert 16 has an internal tubular part 54 that extends upward from the tip of its convex part 40. The tubular part 54 has an internal bore 56 (FIGS. 1 and 4) that receives peg 32. The fit between the bore 56 and peg 32 is such that the bore can slide relative to the peg both at ambient temperatures and at the higher temperatures encountered during the molding process. The tubular part 54 is supported by spokes 58 that extend from the outside of the tubular part to an interior wall of the convex part 40. The other inserts have similar tubular parts supported by spokes. The pegs 30, 32 and 34, that extend upward from the mold recesses, cooperate with the tubular parts of the inserts to support the inserts when the molding process begins and to guide the inserts as they move during the molding process.

As shown in FIG. 1, the molding process is begun by placing one or more of blanks 60, 62 and 64 onto the upper surface 20 of the mold base. These blanks are formed of heat-shrinkable sheet material, preferably a heat-shrinkable polystyrene base material having a water-insoluble coating receptive to coloring materials. Optionally, the blanks can be colored before molding using colored pencils.

As shown in FIG. 1, blank 60 is in the form of a flower, and each of blanks 62 and 64 is in the form of a leaf. The flower blank 60 is formed with a central through hole 66 for receiving guide peg 34 of the mold base. The leaf blanks 62 and 64 are formed with through holes 68 and 70 for receiving guide pegs 30 and 32.

Figure 2:
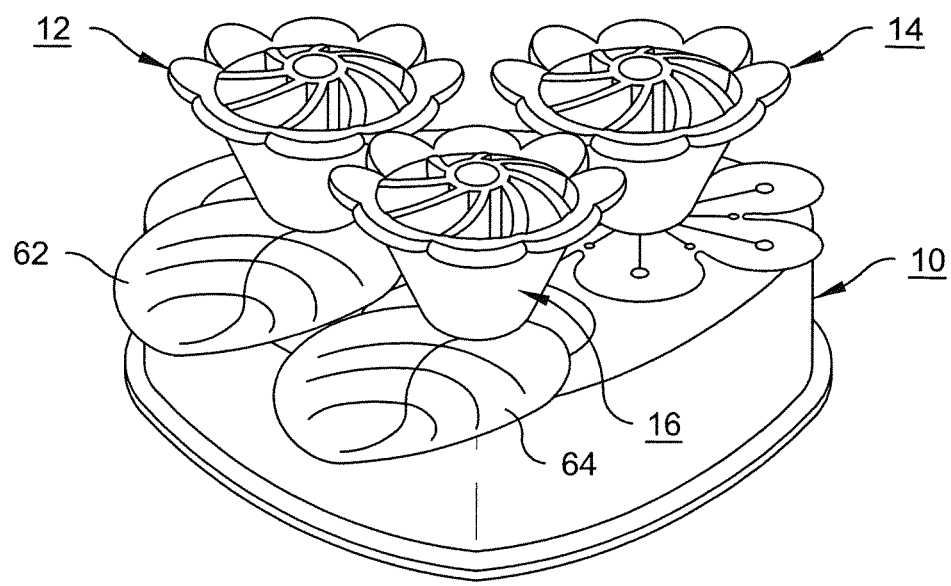
FIG. 2 is a perspective view illustrating an example of the mold assembly before the application of heat.

When the blanks are in place on the upper surface 20 of the mold base 10, the inserts are engaged with the pegs and set in place on top of the blanks as shown in FIG. 2. The assembly is then ready for the heat-shrinking process.

Figure 3:
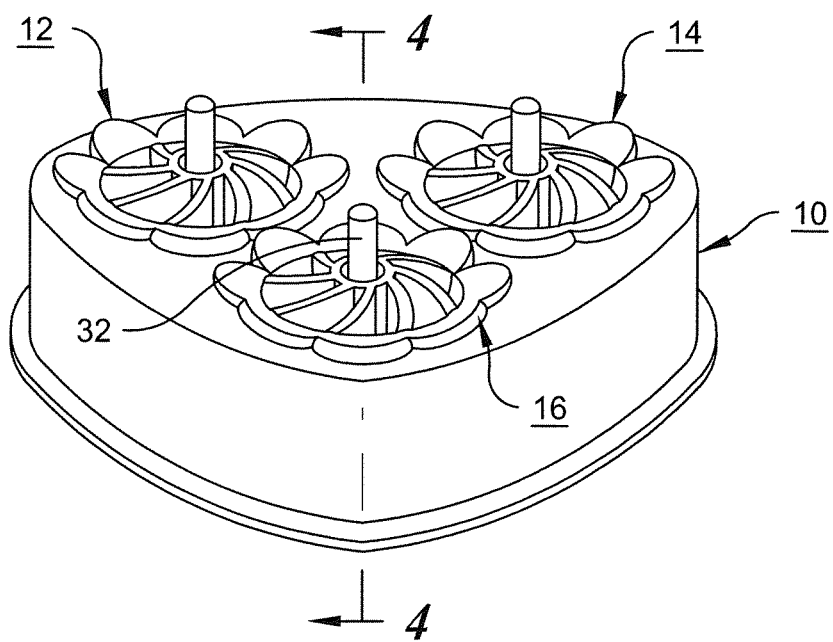
FIG. 3 is a perspective view illustrating the mold assembly of FIG. 2 after the application of heat.
Figure 5:
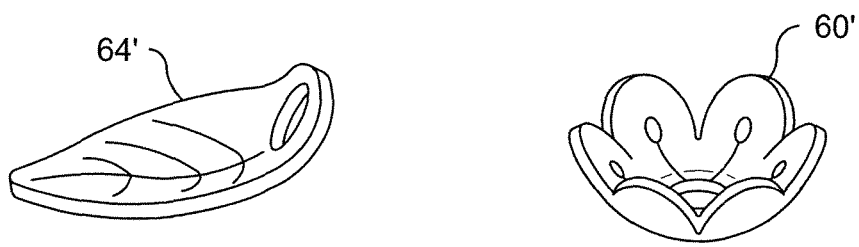
FIG. 5 is a perspective view illustrating two decorative articles produced by the mold shown in FIGS. 1-4.

The heat-shrinking process is carried out by placing the assembly as shown in FIG. 2 in a conventional oven or toaster oven preferably preheated to a temperature of 177° C. (350° F.), and allowed to bake for about 10 minutes. In the heating process, the blanks soften, allowing the mold inserts 12, 14 and 16 to slide by gravity on the guide pegs and into the mold recesses as shown in FIG. 3. The movement of the inserts into the recesses causes the blanks to become concave. At the same time, the heat of the oven causes the blanks to shrink, so that they become much smaller in plan view. Their thickness, however, increases. Thus, leaf blank 70 becomes concave, smaller in plan view, and thicker, and acquires the shape of a concave leaf 64' as shown in FIGS. 4 and 5. The flower blank 60 similar becomes a smaller but thicker concave flower 60'.

After heating in the oven, the mold is allowed to cool, and the finished decorative articles become hard. They can be taken out of the mold by removing the inserts, and manually pressing upward on the bottoms of the recesses to turn the recesses inside out. Turning the recesses inside out will ordinarily be necessary because the shrinkage of the blanks of sheet material causes their through holes to grip the guide pegs tightly.

In some cases, the through holes will be too large to grip the guide pegs. If the holes are too large, further heating of the formed articles while on the pegs, but without the inserts in place, will cause the holes to contract.

Finished decorative articles. such as the concave leaf and flower shown in FIG. 5, can be used to make articles of jewelry. For example, the leaves and flowers can be secured by sewing to a chain to form a bracelet, or used to make earring studs or necklace pendants. Combinations of various flowers, leaves and the like can be utilized in all of these articles of jewelry.

Figure 6:
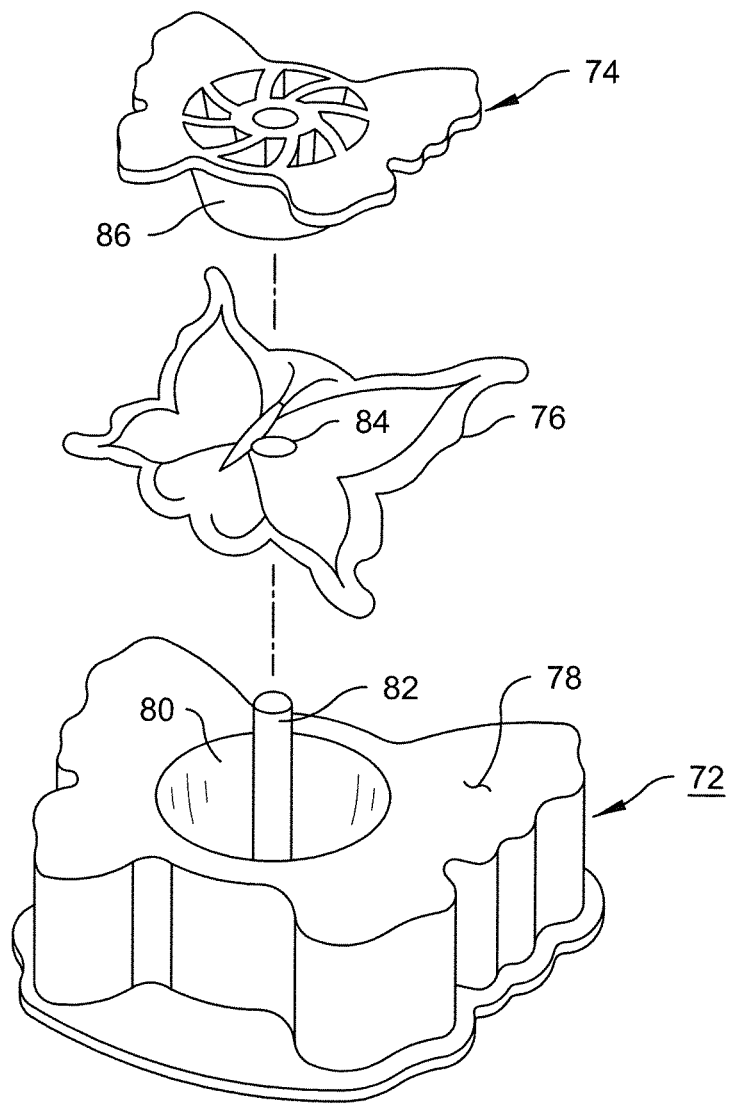
FIG. 6 is an exploded perspective view illustrating the process of fitting a flat blank to a mold in an alternative embodiment of the invention.

As shown in FIG. 6, a single cavity mold base 72 and insert 74 be used with a butterfly-shaped heat-shrinkable blank to make convex butterfly-shaped articles that can be combined with strips of lights to produce decorative lighting. Here, as in the preceding embodiment, a flat butterfly-shape blank 76 is placed on the top surface 78 of mold 72, above the concave mold recess 80, with the guide peg 82 extending upward from the bottom of the mold recess and through hole 84 of the blank. The convex part 86 of the insert is fitted onto the guide peg 82 and allowed to rest on the blank. The assembly is then place in an oven and heated. The resulting product is a rigid butterfly having a wing structure with a concave upper surface, and a central hole that can receive a light on a strip of lights.

As will be apparent, the invention provides the user with the opportunity to make a wide variety of high quality, three-dimensional, decorative articles from heat-shrinkable blanks.

What is claimed is:

1. A method of making a three-dimensional decorative article from a flat blank composed of heat-shrinkable plastic sheet material, said flat blank having first and second opposite sides, the method utilizing a mold comprising:

a mold base having an outer surface, and a concave recess in said surface, said concave recess having a bottom; and a mold insert having a convex mold portion insertable into said concave recess, at least a part of said convex mold portion being shaped so that said part of said convex mold portion can be substantially uniformly spaced from said bottom of said concave recess when the convex mold portion is inserted into said recess by a predetermined distance;

the method comprising the steps of:

forming an assembly composed of said flat blank, said mold base, and said convex mold portion by positioning said flat blank with a first part of said second side of said flat blank in engagement with said outer surface of the mold base and with a second part of said flat blank overlying said concave recess and bringing said convex mold portion into contact with said second part of the flat blank;

placing said assembly in an oven;

heating said mold base, said mold insert, and said flat blank in said oven and thereby softening and shrinking said flat blank;

by heating said mold base, said mold insert, and said flat blank in said oven, allowing gravitational force to cause said convex mold portion to enter said concave recess and push said flat blank into said concave recess, thereby causing said flat blank to be formed to a formed condition in which said first side of said flat blank becomes concave and conforms to the convex mold portion of the mold insert, while the second side of the flat blank becomes convex and conforms to said bottom of said concave recess of the mold base;

cooling said mold base, said mold insert, and said blank, thereby allowing the blank to harden while in said formed condition; and removing said mold insert and the hardened blank from said mold base.

2. The method according to claim 1, wherein said mold insert is formed with a flange on said convex mold portion, said flange extending outward from said convex mold portion by a distance such that at least a part of said flange can overlie at least a part of said outer surface of the mold base when the mold insert is inserted into said concave recess, and wherein said step of removing the hardened blank from the mold is preceded by the step of gripping said flange manually and, while gripping said flange manually, removing said mold insert from the concave recess of the mold base.

3. The method according to claim 1, wherein said mold base and said mold insert are composed of silicone rubber.

4. The method according to claim 1, wherein said mold base is composed of a layer of silicone rubber having a substantially uniform thickness.

5. A method of making a three-dimensional decorative article from a flat blank composed of heat-shrinkable plastic sheet material, said flat blank having first and second opposite sides and an opening extending from said first side to said second side, the method utilizing a mold comprising:

a mold base having a top surface and at least one concave recess in said top surface, said concave recess having an upwardly facing bottom, said bottom having a lowermost part;

a guide peg fixed to said upwardly facing bottom at said lowermost part and extending upward from said bottom and beyond said top surface; and a mold insert having a convex mold portion insertable into said concave recess, and a guide hole having an opening in said convex mold portion for receiving said guide peg;

wherein at least a part of said convex mold portion surrounding said opening of the guide hole has a tip surrounding said opening of the guide hole, and is shaped so that said part of said convex mold portion is substantially uniformly spaced from an opposed bottom portion of said concave recess when the convex mold portion is inserted into said concave recess and said tip is located at a predetermined distance from said lowermost part of the upwardly facing bottom of the recess;

the method comprising the steps of:

forming an assembly from said mold base, said flat blank and said mold insert, by inserting said guide peg through said opening in the flat blank and causing said flat blank to rest on said top surface of the mold base with a part of said second side of the flat blank in contact with the top surface of the mold base whereby an upper part of the guide peg protrudes beyond said first side of the flat blank, causing the guide peg to enter said opening of said guide hole, and causing the mold insert to rest on the first side of the flat blank with the guide peg extending at least part way through said guide hole;

heating said assembly and thereby causing said flat blank to soften and shrink, whereby said mold insert is moved by gravitational force so that said convex mold portion of said mold insert enters said concave recess, and causes said flat blank to be formed to a formed condition in which said first side of said flat blank becomes concave and conforms to the convex portion of the mold insert, while the second side of the flat blank becomes convex and conforms to the upwardly facing bottom of said concave recess of the mold base;

cooling said assembly, thereby allowing the formed blank to harden while in said formed condition;

removing said mold insert from the mold base; and removing the hardened blank from the mold base.

6. The method according to claim. 5, wherein said mold insert is formed with a flange on said convex mold portion, said flange extending outward from said convex mold portion by a distance such that at least a part of said flange can overlie at least a part of said top surface of said mold base when the mold insert is inserted into said concave recess, and wherein said step of removing said mold insert from the mold base is carried out by manually gripping said flange.

7. The method according to claim 5, wherein said mold base, and said mold insert are composed of silicone rubber.

8. The method according to claim 5, wherein said mold base, said guide peg, and said mold insert are composed of silicone rubber.

9. The method according to claim 5, wherein said mold base is composed of a layer of silicone rubber having a substantially uniform thickness.

10. The method according to claim 5, wherein said convex mold portion of said mold insert has a concave interior surface having an apex adjacent said opening of the guide hole, wherein said mold portion is formed with a tube extending from said apex and having a central passage forming said guide hole, and plural spokes connecting said tube and said concave interior surface of said convex mold portion.

\* \* \* \* \*